United States Patent
Hunter et al.

(10) Patent No.: US 10,899,438 B2
(45) Date of Patent: Jan. 26, 2021

(54) SEALS FOR ROTOR SYSTEM FAIRINGS

(71) Applicant: Sikorsky Aircraft Corporation, Stratford, CT (US)

(72) Inventors: David H. Hunter, Cheshire, CT (US); Eric L. Nussenblatt, Stamford, CT (US); William J. Eadie, Cheshire, CT (US); Chris P. Butler, Frisco, TX (US); Bryan K. Baskin, Arlington, TX (US)

(73) Assignee: Sikorsky Aircraft Corporation, Stratford, CT (US)

( * ) Notice: Subject to any disclaimer, the term of this patent is extended or adjusted under 35 U.S.C. 154(b) by 373 days.

(21) Appl. No.: 15/774,659

(22) PCT Filed: Oct. 7, 2016

(86) PCT No.: PCT/US2016/055893
§ 371 (c)(1),
(2) Date: May 9, 2018

(87) PCT Pub. No.: WO2017/123291
PCT Pub. Date: Jul. 20, 2017

(65) Prior Publication Data
US 2018/0305003 A1      Oct. 25, 2018

Related U.S. Application Data

(60) Provisional application No. 62/254,482, filed on Nov. 12, 2015.

(51) Int. Cl.
*B64C 27/10* (2006.01)
*B64C 7/00* (2006.01)
(Continued)

(52) U.S. Cl.
CPC .............. *B64C 27/10* (2013.01); *B64C 7/00* (2013.01); *B64C 27/04* (2013.01); *B64C 27/32* (2013.01);
(Continued)

(58) Field of Classification Search
CPC .......... B64C 7/00; B64C 27/04; B64C 27/10; B64C 27/32; B64C 11/14; B64C 11/02; F16J 15/16; F16J 15/50; F16J 15/52
See application file for complete search history.

(56) References Cited

U.S. PATENT DOCUMENTS 3,056,456 A   10/1962   Michel et al.
3,217,811 A   11/1965   Hibyan et al.
(Continued)

FOREIGN PATENT DOCUMENTS

EP   1614615 A2   1/2006
EP   2727832 A1   5/2014

OTHER PUBLICATIONS

Extended European Search Report for European Application No. 16885379.4; Report dated Apr. 1, 2019 (pp. 1-10).
(Continued)

*Primary Examiner* — Brian P Wolcott
(74) *Attorney, Agent, or Firm* — Michael Best & Friedrich LLP (57) ABSTRACT

A fairing system, includes a hub fairing and a fixed fairing, such as a shaft fairing or a pylon fairing, both arranged about a rotation axis. A gap is defined between the hub fairing and the fixed fairing, and a seal assembly is axially interposed between the hub fairing and the fixed fairing. The fixed fairing and the hub fairing are both removably mounted to the seal assembly such that either or both of the fairings can
(Continued)

be dismounted from the seal assembly without disturbing the seal assembly to provide access to components disposed within the fairing.

20 Claims, 5 Drawing Sheets (51) Int. Cl.
F16J 15/16 (2006.01)
B64C 27/32 (2006.01)
F16J 15/52 (2006.01)
F16J 15/50 (2006.01)
B64C 27/04 (2006.01)
B64C 11/14 (2006.01)
B64C 11/02 (2006.01)

(52) U.S. Cl.
CPC ............. *F16J 15/16* (2013.01); *F16J 15/50* (2013.01); *F16J 15/52* (2013.01); *B64C 11/02* (2013.01); *B64C 11/14* (2013.01)

(56) References Cited

U.S. PATENT DOCUMENTS

| | | | |
|---|---|---|---|
| 3,310,120 A | 3/1967 | Vacca | |
| 5,141,398 A | 8/1992 | Bietenhader et al. | |
| 7,229,251 B2 * | 6/2007 | Bertolotti | B64C 1/00 416/128 |
| 7,510,377 B1 | 3/2009 | Carter, Jr. et al. | |
| 7,607,607 B2 * | 10/2009 | Darrow, Jr. | B64C 7/00 244/17.19 |
| 7,621,480 B2 * | 11/2009 | Darrow, Jr. | B64C 1/00 244/130 |
| 2008/0131280 A1 | 6/2008 | Krauss et al. | |
| 2015/0125299 A1 | 5/2015 | Baskin et al. | |
| 2017/0283046 A1 * | 10/2017 | Egolf | B64C 7/00 |

OTHER PUBLICATIONS

International Search Report for International Application No. PCT/US2016/055893; dated Jun. 15, 2017; 3 pages.
Written Opinion of the International Search Report for International Application No. PCT/US2016/055893; dated Jun. 15, 2017; 6 pages.

* cited by examiner

SEALS FOR ROTOR SYSTEM FAIRINGS

CROSS REFERENCE TO RELATED APPLICATIONS

The subject invention claims the benefit of and priority to U.S. Provisional Application Ser. No. 62/254,482 filed Nov. 12, 2015, the disclosure of which is herein incorporated by reference in its entirety.

BACKGROUND OF THE INVENTION

1. Field of the Invention

The present disclosure relates to rotorcraft aerodynamics, and more particularly to rotorcraft rotor system aerodynamics.

2. Description of Related Art

In rotorcraft, the aerodynamic drag associated with the rotorcraft rotor system can contribute significantly to the overall aerodynamic drag of the rotorcraft. For example, in single rotor system rotorcraft such as helicopters, the aerodynamic drag attributable to the rotor system can be responsible for upwards of 25% or more of the total aerodynamic drag of the rotorcraft. In rotorcraft having dual rotor systems, such as rotorcraft with coaxial contra-rotating rotor systems, the aerodynamic drag associated with the rotor assemblies can be even higher, and may result in significant power and efficiency penalties under certain conditions like high-speed flight. Fairings are commonly employed on aircraft to reduce the aerodynamic drag associated with certain types of static aircraft structures.

Such conventional methods and systems have generally been considered satisfactory for their intended purpose. However, there is still a need in the art for improved fairings. The present disclosure provides a solution for this need.

SUMMARY OF THE INVENTION

A fairing system includes a hub fairing and a fixed fairing both arranged about a rotation axis. A gap is defined between the hub fairing and the fixed fairing, and a seal assembly is axially interposed between the hub fairing and the fixed fairing. The fixed fairing and the hub fairing are both removably mounted to the seal assembly such that either or both of the fairings can be dismounted from the seal assembly without disturbing the seal assembly to provide access to components disposed within the fairing.

In certain embodiments, the fairing system can include a support structure. The seal assembly can be connected to the support structure such that the seal assembly couples the fairing to the support structure. The hub fairing can be mounted to the seal assembly and can be coupled to a hub fairing support structure through the seal assembly. The fixed fairing can be mounted to the seal assembly and can be coupled to a fixed fairing support structure through the seal assembly. The seal assembly can be interposed between a rotor system and a rotor system pylon of a rotorcraft. The seal assembly can be interposed between contra-rotating, coaxial rotor systems. The seal assembly can be a first seal assembly, and rotor system can include a second seal assembly and/or a third seal assembly disposed about the rotation axis. The fixed fairing can be a shaft fairing for a coaxial contra-rotating rotor system of a rotorcraft. The fixed fairing can be pylon fairing for a helicopter main rotor pylon.

In accordance with certain embodiments, the seal assembly can include a seal race, a seal member, and a seal member housing. The seal member can include an annulus portion connected to resilient flange portion. The resilient flange portion can extend radially relative to the rotation axis. The seal race can include a sealing face and a channel. The sealing face can be radially offset from or overlap the channel, and can be in mechanical contact with the resilient flange about the rotation axis. The channel of the seal race can have a channel profile with axially opposed faces. A c-shaped segment can span the axially opposed faces. A portion of the fairing can seat against either of the axially opposed faces. It is contemplated that a face of the channel can exert a force on the fairing having an axial component.

It is also contemplated that, in accordance with certain embodiments, the seal housing can have an annular groove and a fairing seat. The annular groove can be offset radially from the fairing seat relative to the rotation axis. The annulus portion of the seal member can be seated within the annular groove. The fairing seat can have a shelf, and a portion of the fairing can be seated on the shelf. The fairing seat can also have channel that is adjacent to the shelf, and the portion of the fairing can be seated on both the shelf and within the fairing seat channel. The fairing seat can exert a force on the fairing with an axial component.

A fairing system includes a first hub fairing arranged about a rotation axis, a second hub fairing arranged about the rotation axis, and a shaft fairing interposed between the first and second hub fairings. A first seal assembly is disposed between the first hub fairing and the shaft fairing. A second seal assembly is disposed between the second hub fairing and the shaft fairing. The first hub fairing is mounted to the first seal assembly, the shaft fairing is mounted both the first and second seal assemblies, and the second hub fairing is mounted to the second seal assembly. In embodiments, a pylon fairing arranged about the rotation axis and on side of the second hub fairing opposite the shaft fairing and a pylon seal assembly is disposed between the second hub fairing and the pylon fairing with second hub fairing mounted to the pylon seal assembly. The shaft fairing can be fixed relative to the first hub fairing and/or the second hub fairing. The shaft fairing can be rotatable about the rotation axis relative to the pylon fairing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
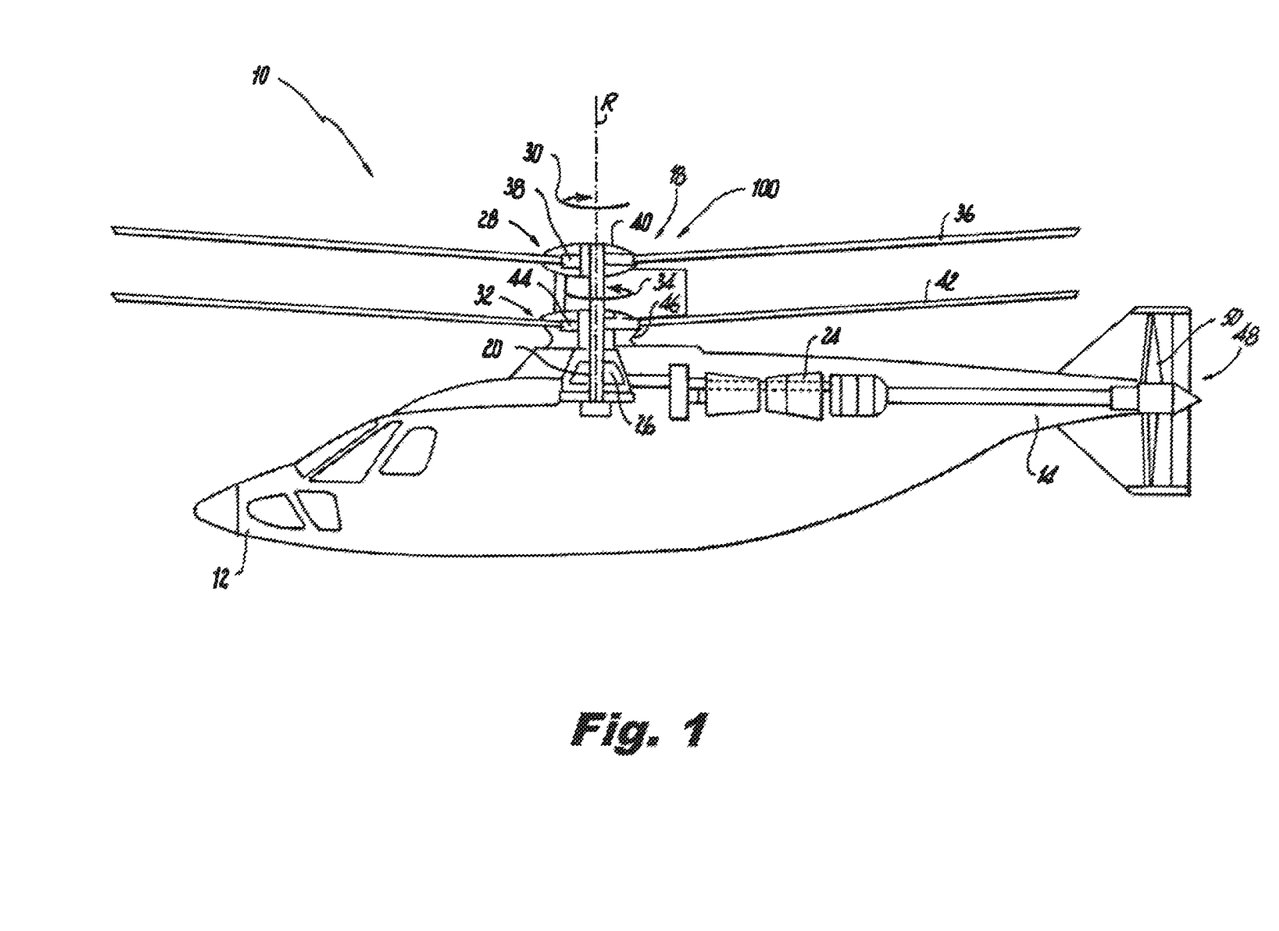
FIG. 1 is a schematic side elevation view of an exemplary embodiment of a rotorcraft constructed in accordance with the present disclosure, showing a rotorcraft with coaxial contra-rotating rotor system with rotor assemblies mounted for rotation in opposite directions about a common rotation axis.

Reference will now be made to the drawings wherein like reference numerals identify similar structural features or aspects of the subject disclosure. For purposes of explanation and illustration, and not limitation, a partial view of an exemplary embodiment of a rotorcraft including a fairing system in accordance with the disclosure is shown in FIG. 1 and is designated generally by reference character 10. Other embodiments of fairing systems and rotorcraft with fairing systems in accordance with the disclosure, or aspects thereof, are provided in FIGS. 2-5, as will be described. The systems and methods described herein can be used in aircraft, such as in high-speed rotorcraft having coaxial contra-rotating rotor systems, however the invention is not limited to a particular type of aircraft or to aircraft in general.

Referring now to FIG. 1, rotorcraft 10 is shown. Rotorcraft 10 includes an airframe 12 with a longitudinally extending tail 14. Airframe 12 supports a coaxial contra-rotating rotor system 18 for rotation about a rotation axis R. One or more engines 24 are operably connected to coaxial contra-rotating rotor system 18 through a gearbox 26 and maul rotor shafts 20 (a single shaft being illustrated for clarity), main rotor shafts 20 being rotatably disposed along rotation axis R. A translational thrust system 48 is located at an end of longitudinally extending tail 14 to provide translational thrust for the helicopter 10. For example, in the illustrated exemplary embodiment, translational thrust system 48 includes a propeller rotor 50 connected to and driven by the at least one engine 24 via the gearbox 26. While shown in the context of a pusher-prop configuration, it is understood that the propeller rotor 50 could also be more conventional puller prop or could be variably facing so as to provide torque in addition to or instead of translational thrust.

Coaxial contra-rotating rotor system 18 includes a first rotor assembly 28 and a second rotor assembly 32. First rotor assembly 28 includes a plurality of rotor blades 36 coupled to a first rotor hub 38. Second rotor assembly 32 includes a plurality of rotor blades 42 coupled to a second rotor hub 44. Both first rotor assembly 28 and second rotor assembly 32 receive rotational energy through gearbox 26 via main rotor shafts 20 from engine 24, the rotational energy driving first rotor assembly 28 in a first direction 30 about rotation axis R and second rotor assembly 32 in a second direction 34 about rotation axis R. Second direction 34 is opposite to first direction 30. While FIG. 1 shows first direction 30 as clockwise and second direction 34 as counterclockwise about rotation axis R, it is to be understood and appreciated that in some embodiments the directions of rotation of the first rotor assembly 28 and second rotor assembly 32 may be reversed. A sealed fairing system 100 encloses main rotor shafts 20 and portions of the first rotor assembly 28 and second rotor assembly 32 of coaxial contra-rotating rotor system 18.

Figure 2:
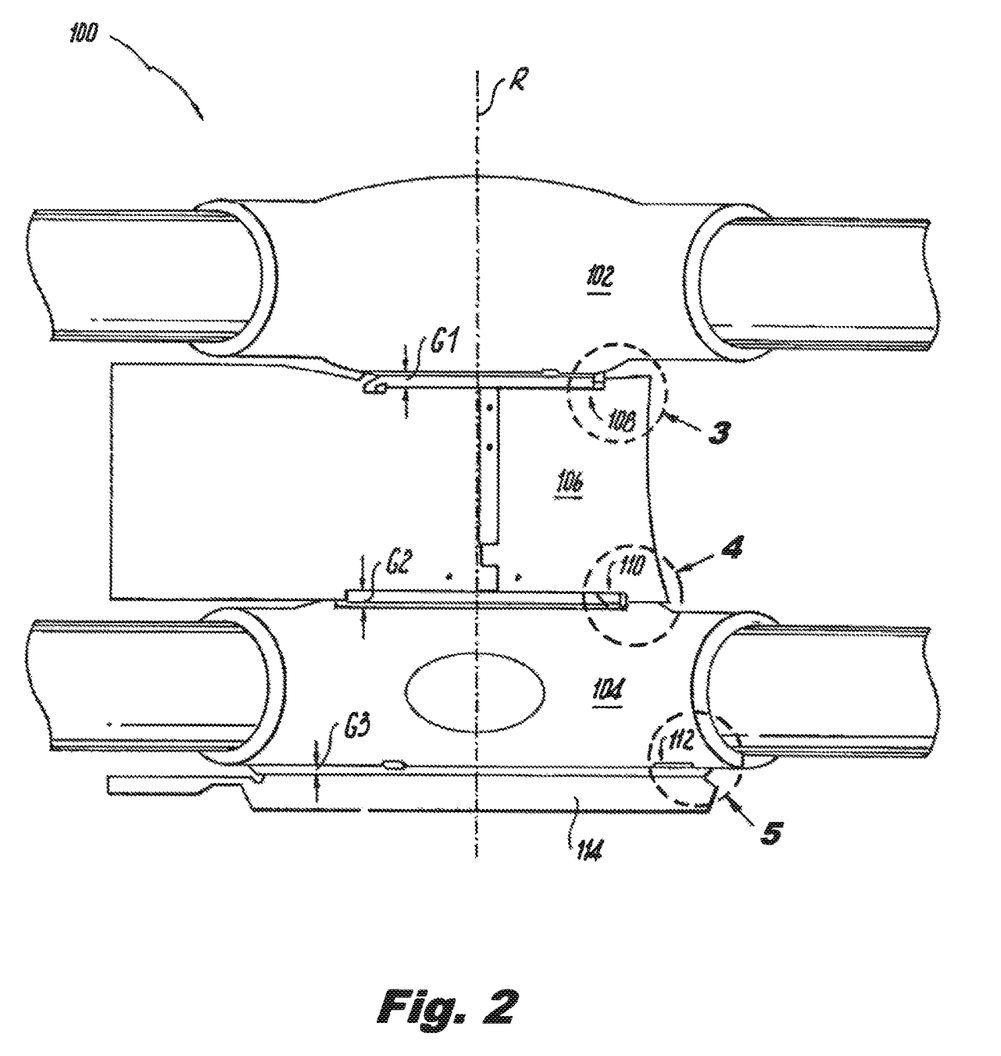
FIG. 2 is a schematic side elevation view of the coaxial contra-rotating rotor system of the rotorcraft of FIG. 1, showing a shaft fairing interposed between hub fairings of first and second coaxial contra-rotating rotor assemblies.

With reference to FIG. 2, fairing system 100 is shown. Fairing system 100 includes a first hub fairing 102 arranged about rotation axis R, a second hub fairing 104 arranged about rotation axis R, and a shaft fairing 106 axially interposed along rotation axis R between first hub fairing 102 and second hub fairing 104. A pylon fairing 114 is coupled to airframe 12 (shown in FIG. 1) and is fixed relative to both first hub fairing 102 and second hub fairing 104, and may additionally be fixed relative to shaft fairing 106. First hub fairing 102 and second hub fairing 104 are both rotatable relative to pylon fairing 114 about rotation axis R. Shaft fairing 106 may fixed relative to first hub fairing 102 and second hub fairing 104. Shaft fairing 106 may be fixed, or movable relative to pylon fairing 114.

Gaps are defined between axially adjacent fairings for purpose of preventing clashing together of structures moving relative to one another. In this respect, a first gap G1 is defined between first hub fairing 102 and shaft fairing 106, a second gap G2 is defined between shaft fairing 106 and second hub fairing 104, and a third gap G3 is defined between second hub fairing 104 and pylon fairing 114. A first seal assembly 108 is disposed between first hub fairing 102 and shaft fairing 106, and sealably extends about rotation axis R within first gap G1. A second seal assembly 110 is disposed between shaft fairing 106 and second hub fairing 104, and sealably extends about rotation axis R within second gap G2. A pylon seal assembly 112 is disposed between second hub fairing 104 and pylon fairing 114, and sealably extends about rotation axis R within third gap G3, will be appreciated by those of skill in the art, incorporating one or more of first seal assembly 108, second seal assembly 110, and pylon seal assembly 112 within rotor system 18 (shown in FIG. 1) can reduce the aerodynamic drag with coaxial contra-rotating rotor system 18 that could otherwise exhibit significant power loss during high-speed flight.

In the illustrated exemplary embodiment, coaxial rotorcraft 10 includes four fairings, i.e. first hub fairing 102, shaft fairing 106, second hub fairing 104, and pylon fairing 114, with seal assemblies interposed in gaps defined axially between fairings such that one or more of the fairings may sealably rotate relative to another of fairings, it is to be appreciated and understood that this is for illustration purposes and is non-limiting. In embodiments, such as helicopter rotorcraft having a single rotor assembly, fairing systems may include a single seal assembly axially interposed between a rotor hub fairing and a rotor pylon fairing of the helicopter. In certain embodiments, fairing system 100 may include less than three seal assemblies interposed between fairings in coaxial contra-rotating rotor systems. For example, first hub fairing 102 may be mounted to first seal assembly 108, shaft fairing 106 may be mounted to both first seal assembly 108 and second seal assembly 110, and a second hub assembly 104 may be mounted to second seal assembly 110—and third gap G3 may be unsealed. Alternatively, fairing system 100 may additionally include a pylon seal assembly 112 disposed between second hub fairing 104 and pylon fairing 114.

Figure 3:
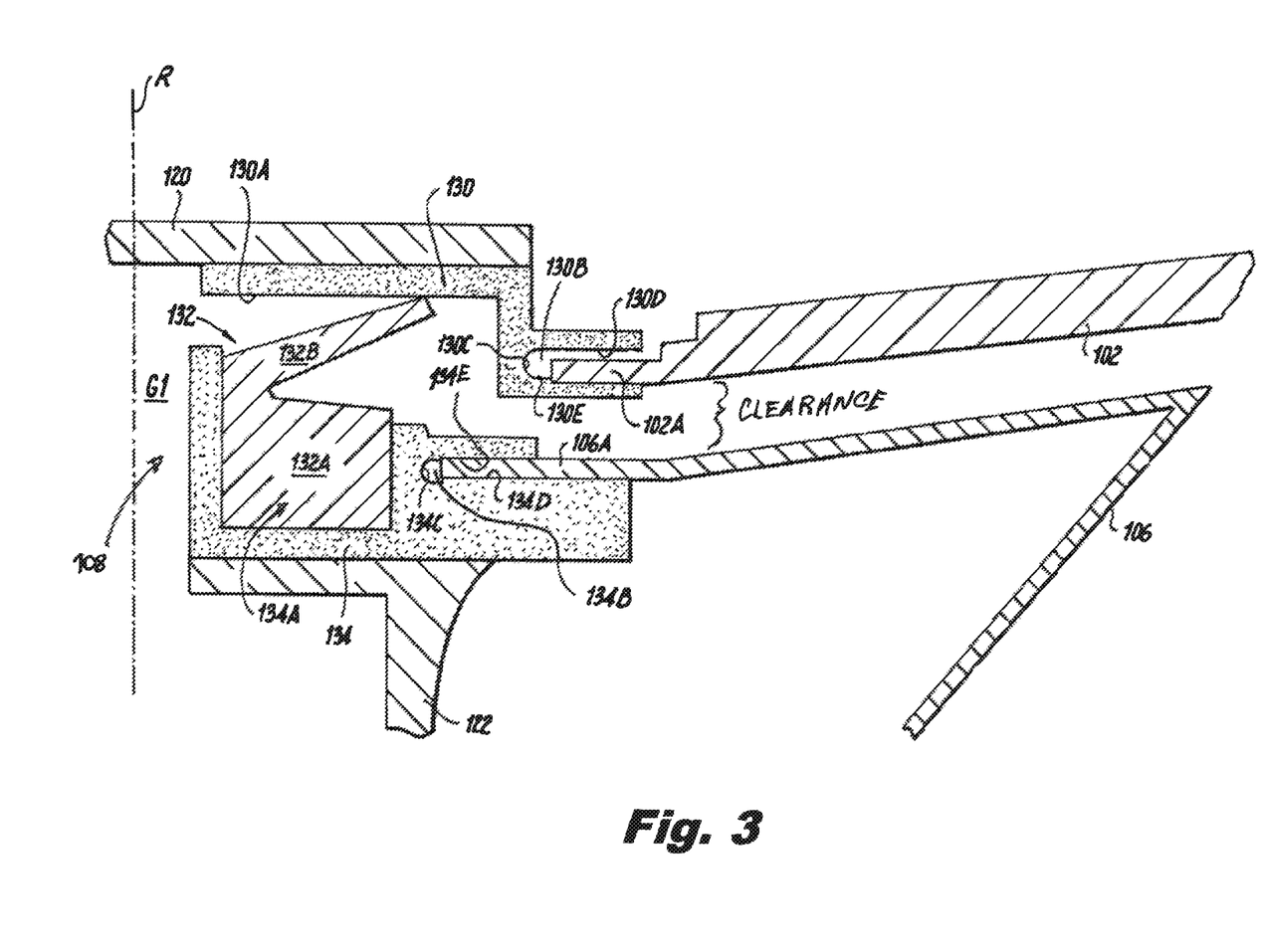
FIG. 3 is schematic cross-sectional side elevation view of the coaxial contra-rotating rotor system of FIG. 1, showing the first hub fairing and the shaft fairing mounted to a seal assembly disposed in an axial gap defined between the first hub and shaft fairings.
Figure 4:
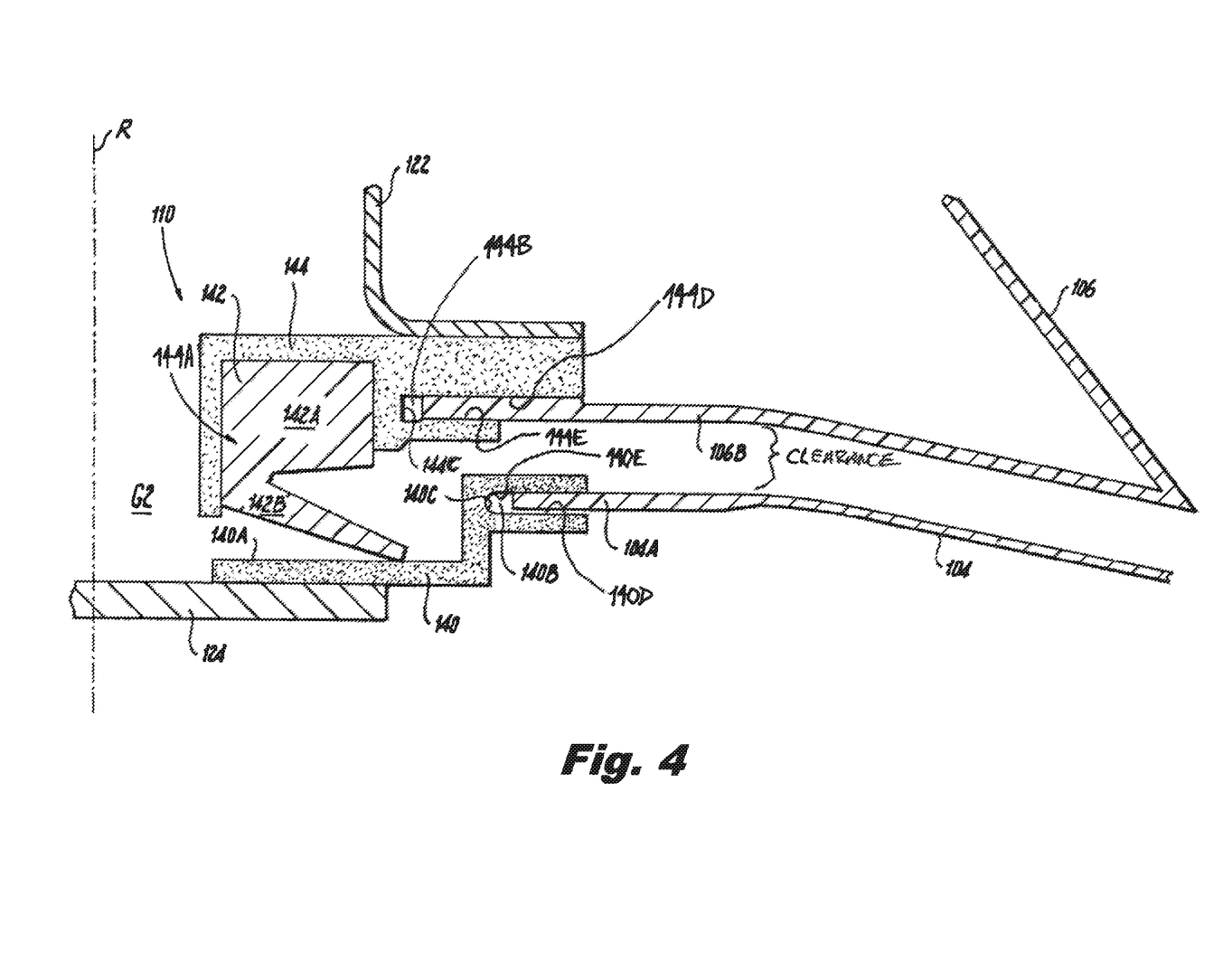
FIG. 4 is schematic cross-sectional side elevation view of a portion of the coaxial contra-rotating rotor system of FIG. 1, showing the second hub fairing and the shaft fairing mounted to a seal assembly disposed in an axial gap defined between the second hub and shaft fairings.
Figure 5:
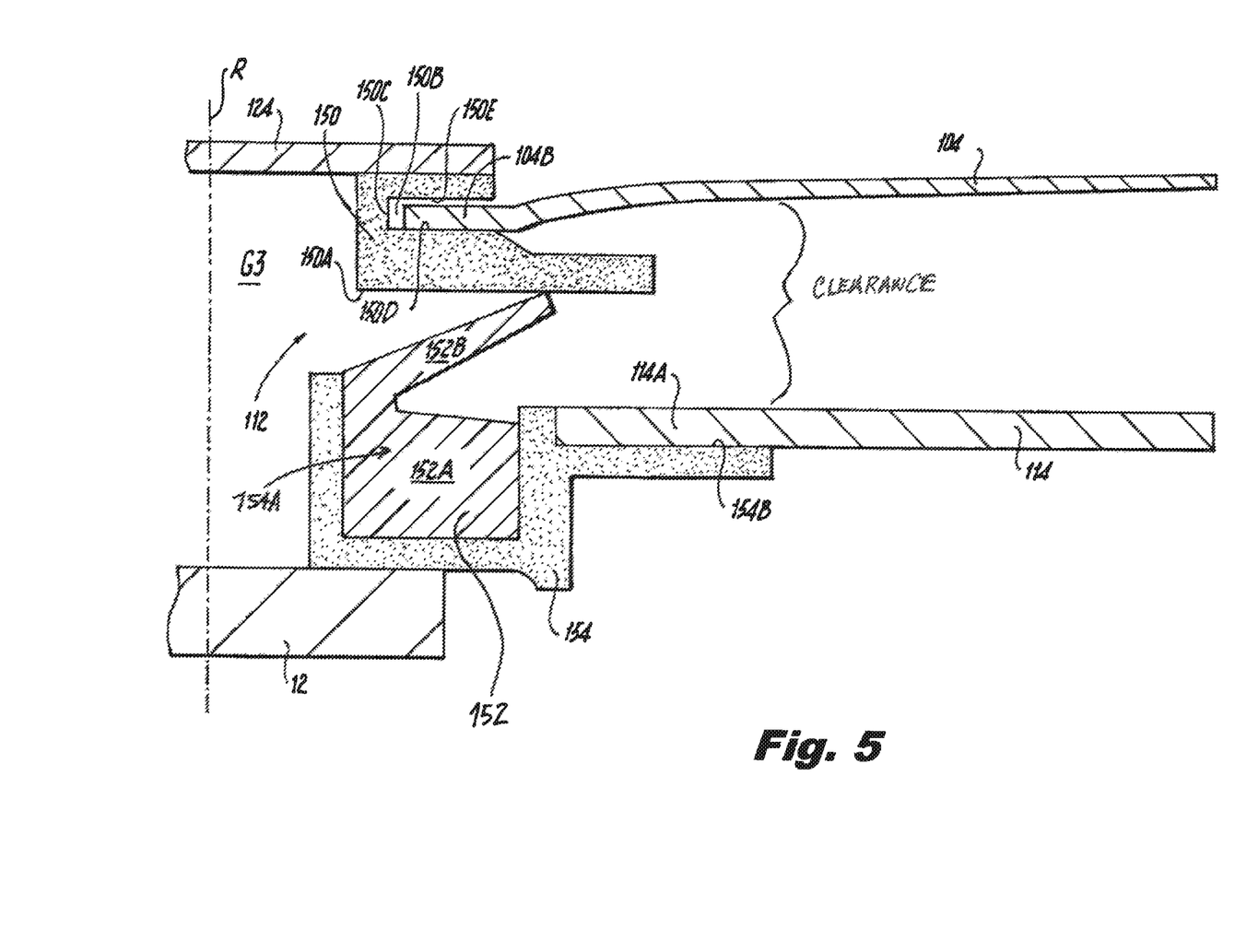
FIG. 5 is schematic cross-sectional side elevation view of a portion of the coaxial contra-rotating rotor system of FIG. 1, showing the second hub fairing and a pylon fairing mounted to a seal assembly disposed in an axial gap defined between the second hub and pylon fairings.

Referring now to FIGS. 3-5, seal assemblies mounting fairing system 100 are shown. Fairing system 100 generally includes a first hub fairing support structure 120 (shown in FIG. 3), a shaft hub fairing support structure 122. (shown in FIGS. 3 and 4), and a second hub fairing support structure 124 (shown in FIG. 5). First hub fairing support structure 120 is carried by first rotor assembly 28 (shown in FIG. 1) and is fixed relative thereto for common rotation with first rotor assembly 28. Second hub fairing support structure 124 is carried by second rotor assembly 32 (shown in FIG. 1) and is fixed relative thereto for common rotation with second rotor assembly 32 and in an opposite direction with respect to first hub fairing support structure 120. Shaft fairing support structure 122 is carried by a structure, such as a standpipe surrounding main rotor shafts 20 (shown in FIG. 1) that is fixed relative to by first hub fairing support structure 120 and second hub fairing support structure 124. Examples of such standpipes are described in U.S. Patent Application Publication No. 2015/125,299 A1 to Baskin et al., the contents of which are incorporated herein by reference.

With reference to FIG. 3, first seal assembly 108 is shown. First seal assembly 108 is disposed about rotation axis R in first gap G1 and includes a seal race 130, a seal member 132, and a seal housing 134. Seal race 130 is fixed to first hub fairing support structure 120. Seal member 132 is fixed to seal housing 134 and sealably contacts seal race 130 about rotation axis R. Seal housing 134 is fixed to shaft fairing support structure 122.

Seal race 130 includes a sealing face 130A and a fairing seat 130B. Sealing face 130A is disposed radially outward of rotation axis R and is in mechanical contact with seal member 132. Fairing seat 130B is disposed radially outward of sealing face 130A relative to rotation axis R, is axially offset therefrom toward shaft fairing 106 such that fairing seat 130B axially overlaps a resilient flange portion 132B of seal member 132, and is bounded by an upper fairing engagement surface 130D—a lower fairing engagement surface 130E, and a radially inner channel segment 1300 spanning upper fairing engagement surface 130D and lower fairing engagement surface 130D of fairing seat 130B.

Fairing seat 130B opens radially outward relative to rotation axis R. First hub fairing 102, for example an inboard flange portion 102A of first hub fairing 102, is received within fairing sea 130B such that first fairing 102 mounts to first hub fairing support structure 120 through first seal assembly 108 with structure that in fixed axial positions along rotation axis R. Upper fairing engagement surface 130D and lower fairing engagement surface 130E axially restrain first hub fairing 102 along rotation axis R. Radially inner channel segment 130C, which may be c-shaped, tapers for radially for positioning first hub fairing 102 relative to rotation axis R. This enables first hub fairing 102 to be installed/reinstalled without disturbing the sealing engagement of resilient flange portion 132B of seal member 132 and sealing face 130A of seal race 130.

Seal member 132 includes resilient flange portion 132B and an annulus portion 132A. On an end opposite resilient flange portion 132B sealably engages seal race 130 continuously about rotation axis R. On an end opposite seal race 130 resilient flange portion 132B is connected to annulus portion 132A of seal member 132.

Seal housing 134 includes an annular groove 134A and a fairing seat 134B. Annular groove 134A is radially offset from rotation axis R, opens axially towards seal race 130, and seats an annulus portion 132A of seal member 132. Fairing seat 134B is disposed radially outward of annular groove 134A relative to rotation axis R, axially overlaps annulus portion 132A of seal member 132, and is bounded by an upper fairing engagement surface 134E, a lower fairing engagement surface 134D, and a radially inner channel surface 134C spanning upper fairing engagement surface 134E and lower fairing engagement surface 134D.

An upper portion of shaft fairing 106, such as an upper mounting flange 106A, is received within fairing seat 134B such that the upper fairing engagement surface 134D and lower fairing engagement surface 134E axially restrain shaft fairing 106, thereby maintaining an axial clearance defined between shaft fairing 106 and first hub fairing 102. The axially fixing is independent of the sealing engagement of seal member 132 and seal race 130, allowing for installation and/or reinstallation of shaft fairing 106 without disturbing the seal provided by seal member 132 and seal race 130 between shaft fairing 106 and first hub fairing 102. It is contemplated that radially inner channel surface 134C may be tapered, such as with a c-shape, thereby enable radially locating shaft fairing 106 and retaining shaft fairing 106 therein without fasteners, simplifying installation/reinstallation and/or reducing the weight of fairing system 100.

With reference to FIG. 4, second seal assembly 110 is shown. Second seal assembly 110 includes a seal housing 144, a seal member 142, and a seal race 140. Seal housing 144 is fixed to shaft fairing support structure 122. Seal member 142 is fixed to seal housing 144 and sealably contacts seal race 140 about rotation axis R. Seal race 140 is fixed to second hub fairing support structure 124. Seal housing 144, seal member 142, and seal race 140 are similar to seal housing 134 (shown in FIG. 3), seal member 132 (also shown in FIG. 3) and seal race 130 (additionally shown in FIG. 3), with the difference that that second seal assembly 110 is disposed about rotation axis R in second gap G2 defined between shaft fairing 106 and second hub fairing 104 and that the positional arrangement of the respective seal elements is reversed relative to shaft fairing 106.

Seal housing 144 includes an annular groove 144A and a fairing seat 144B. Annular groove 144A is radially offset from rotation axis R and seats an annulus portion 142A of seal member 142. Fairing seat 144B is disposed radially outward of annular groove 144A relative to rotation axis R, axially overlaps annulus portion 142A of seal member 142, and is bounded by an upper fairing engagement surface 144D, a lower fairing engagement surface 144E, and a radially inner channel surface 144C spanning upper fairing engagement surface 144D and lower fairing engagement surface 144E.

A lower portion of shaft fairing 106, such as a lower mounting flange 106B, is received within fairing seat 144B such that the upper fairing engagement surface 144D and lower fairing engagement surface 144E axially restrain shaft fairing 106, thereby maintaining a lower axial clearance defined between shaft fairing 106 and second hub fairing 104. The axially fixing is independent of the sealing engagement of seal member 142 and seal race 140, allowing for installation and/or reinstallation of shaft fairing 106 without disturbing the seal provided by seal member 142 and seal race 140 between shaft fairing 106 and second hub fairing 104. It is contemplated that radially inner channel surface 144C may be tapered, such as with a c-shape, thereby enable radially locating shaft fairing 106 and retaining shaft fairing 106 therein without fasteners, simplifying installation/reinstallation and/or reducing the weight of fairing system 100.

Seal member 142 includes annulus portion 142A and a resilient flange portion 142B. Annulus portion 142A of seal member 142 is seated within annular groove 144A of seal housing 144. Resilient flange portion 142B of seal member 142 is connected to annulus portion 142A at its radially inner end, and sealably contacts seal member 140 at an end opposite annulus portion 142A continuously about rotation axis R.

Seal race 140 includes a sealing face 140A and a fairing seat 140B. Sealing face 140A is disposed radially outward of rotation axis R and is in mechanical contact with an end of resilient flange portion 142B opposite annulus portion 142A. Fairing seat 140B is disposed radially outward of seal race 140 relative to rotation axis R, is axially offset therefrom toward shaft fairing 106 such that fairing seat 140B axially overlaps resilient flange portion 142B, and is bounded by an upper fairing engagement surface 140E, a lower fairing engagement surface 140D, and a radially inner channel segment 140C spanning upper fairing engagement surface 140E and lower fairing engagement surface 140D of fairing seat 140B.

Fairing seat 140B opens radially outward relative to rotation axis R. Second hub fairing 104, for example an inboard flange portion 104A of second hub fairing 104, is received within fairing seat 140B such that second fairing 104 mounts to second hub fairing support structure 124 through second seal assembly 110 through axially fixed structure. Upper fairing engagement surface 140E and lower fairing engagement surface 140D axially restrain second hub fairing 140 along rotation axis R. Radially inner channel segment 140C, which may be c-shaped, tapers for radially positioning second hub fairing 104 relative to rotation axis R. As above, this enables second hub fairing 104 to installed/reinstalled without disturbing the sealing engagement of resilient flange portion 142B and seating face 140A.

With reference to FIG. 5, pylon seal assembly 112 is shown. Pylon seal assembly 112 is similar to first seal assembly 108, is disposed about rotation axis R in third gap G3, and includes a seal race 150, a seal member 152, and a seal housing 154. Seal race 150 is fixed to second hub fairing support structure 124. Seal member 152 is fixed to seal housing 154 and sealably contacts seal race 150 about rotation axis R. Seal housing 154 is in turn fixed to airframe 12.

Seal race 150 includes a sealing face 150A and a fairing seat 150B. Sealing face 150A is disposed radially outward of rotation axis R and is in mechanical contact with seal member 152. Fairing seat 150B axially overlaps seal member 152, is axially offset therefrom toward second hub fairing 104, and is bounded by an upper fairing engagement surface 150E, a lower fairing engagement surface 150D, and a radially inner channel segment 150C spanning between upper fairing engagement surface 150E and lower fairing engagement surface 150D.

Fairing seat 150B opens radially outward relative to rotation axis R. Second hub fairing 104, for example an inboard flange portion 104B of first hub fairing 102, is received within fairing seat 150B such that second fairing 104 mounts to second hub fairing support structure 124 through pylon seal assembly 112 with structure that in fixed axial positions along rotation axis R. Upper fairing engagement surface 150E and lower fairing engagement surface 150D axially restrain second hub fairing 104 along rotation axis R. Radially inner channel segment 150O, which may be c-shaped, tapers for radially for positioning second hub fairing 104 relative to rotation axis R. This enables second hub fairing 104, in cooperation with above-described second seat assembly 110, to be installed/reinstalled without disturbing the sealing engagement of seal member 152 and sealing face 150A of seal race 150.

Seal member 152 includes resilient flange portion 152B and an annulus portion 152A connected to resilient flange portion 152B. On an end opposite annulus portion 152A, resilient flange portion 152B sealably engages seal race 150 continuously about rotation axis R.

Seal housing 154 includes an annular groove 154A and a fairing seat 154B. Annular groove 154A is radially offset from rotation axis R, opens axially towards seal race 150, and seats annulus portion 152A of seal member 152. Fairing seat 154B is disposed radially outward of annular groove 154A relative to rotation axis R and annulus portion 152A of seal member 152 for receiving pylon fairing 114. Pylon fairing 114 sits within fairing seat 154B.

Rotorcraft with hub fairings generally require a gap between the hub fairing and adjacent stationary structure to prevent interference between moving and fixed components. In embodiments described herein, seal assemblies are provided, that seal gaps between the moving and fixed components to improve the lift to drag coefficient of the aircraft—thereby improving efficiency. In certain embodiments, the seal assemblies axially fix moving elements relative to static elements by mounting the fairing assemblies through the seal assembly independent of the structures providing the sealing, thereby allowing for installation/removal/reinstallation without disturbing elements of the seal assembly providing the sealing and facilitating assembly and inspection of rotor system elements disposed within the fairing assemblies. In accordance with certain embodiments, the seal assemblies described herein provide a relatively constant running gap that is more closely tolerance and maintainable over the life of the seal assembly.

The methods and systems of the present disclosure, as described above and shown in the drawings, provide for fairing systems with superior properties including simplified installation, removal, and re-installation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fairing system for a rotorcraft, comprising:
   a hub fairing arranged about a rotation axis;
   a fixed fairing arranged about the rotation axis and adjacent to the hub fairing; and
   a seal assembly interposed axially between the hub fairing and the fixed fairing, the seal assembly including a seal race with a sealing face and a channel,
   wherein the seal assembly spans a gap defined between the hub fairing and the fixed fairing,
   wherein the hub fairing and the fixed fairing are both removably mounted to the seal assembly such that either or both the hub fairing and the fixed fairing can be dismounted from the seal assembly, and
   wherein a portion of at least one of the hub fairing or the fixed fairing is seated within the channel.

2. The fairing system as recited in claim 1, further including a hub fairing support structure connected to the to seal assembly, wherein the hub fairing is mounted to the seal assembly and coupled to the hub fairing support structure through the seal assembly.

3. The fairing system as recited in claim 1, further including a fixed fairing support structure connected to the to seal assembly, wherein the fixed fairing is mounted to the seal assembly and coupled to the fixed fairing support structure through the seal assembly.

4. The fairing system as recited in claim 1, wherein the seal assembly comprises a seal member housing, a seal member seated within the seal member housing, and a seal race in contact with the seal member, wherein one of the seal member and the seal race is rotatable about the rotation axis relative to the other of the seal member and the seal race.

5. The fairing system as recited in claim 4, wherein the seal member includes an annulus portion connected to a resilient flange portion, the resilient flange portion extending radially from and about the rotation axis, wherein the resilient flange is in contact with the seal race.

6. The fairing system as recited in claim 1, wherein the portion of the hub fairing is seated within the channel.

7. The fairing system as recited in claim 1, wherein the portion of the fixed fairing is seated within the channel.

8. The fairing system as recited in claim 1, wherein the channel profile includes axially opposed faces, wherein the portion of the fairing seated in the channel is in contact with one of the axially opposed faces.

9. The fairing system as recited in claim 6, wherein the seal race axially fixes the hub fairing relative to the seal race.

10. The fairing system as recited in claim 8, wherein the channel profile includes a c-shaped segment spanning the axially opposed faces of the channel.

11. The fairing system as recited in claim 6, wherein the channel opens radially outward relative to the rotation axis.

12. The fairing system as recited in claim 6, wherein the sealing face axially overlaps the channel.

13. The fairing system as recited in claim 6, wherein the sealing face is radially adjacent to the channel.

14. The fairing system as recited in claim 1, wherein the seal assembly includes a seal housing with an annular groove and a fairing shelf, wherein a portion of the hub fairing or the fixed fairing is seated on the fairing shelf.

15. The fairing system as recited in claim 14, wherein the seal housing includes a fairing channel disposed radially between the annular groove and the fairing shelf, wherein the portion of the hub fairing or the fixed fairing extends along the shelf and into the fairing channel.

16. A fairing system, comprising:
a first hub fairing arranged about a rotation axis;
a second hub fairing arranged about the rotation axis;
a fixed shaft fairing interposed between the first and second hub fairings;
a first seal assembly between the first hub fairing and the shaft fairing; and
a second seal assembly between the second hub fairing and the shaft fairing, wherein the first hub fairing is mounted to the first seal assembly, wherein the shaft fairing is mounted to both the first and second seal assemblies, and wherein the second hub fairing is mounted to the second seal assembly,
wherein at least one of the first seal assembly or the second seal assembly includes a seal race with a sealing face and channel, and further wherein at least one of the first hub fairing, the second hub fairing, or the fixed shaft fairing is seated within the channel.

17. The fairing system as recited in claim 16, further including:
a fixed pylon fairing arranged about the rotation axis and on side of the second hub fairing opposite the shaft fairing; and
a pylon seal assembly between the second hub fairing and the pylon fairing, wherein the second hub fairing is mounted to the pylon seal assembly.

18. The fairing system as recited in claim 16, wherein the shaft fairing is fixed relative to at least one of the first hub fairing and the second hub fairing.

19. The fairing system as recited in claim 17, wherein the shaft fairing is rotatable about the rotation axis relative to the fixed pylon fairing.

20. A rotorcraft having a fairing system as recited in claim 1.

* * * * *